UNITED STATES PATENT OFFICE.

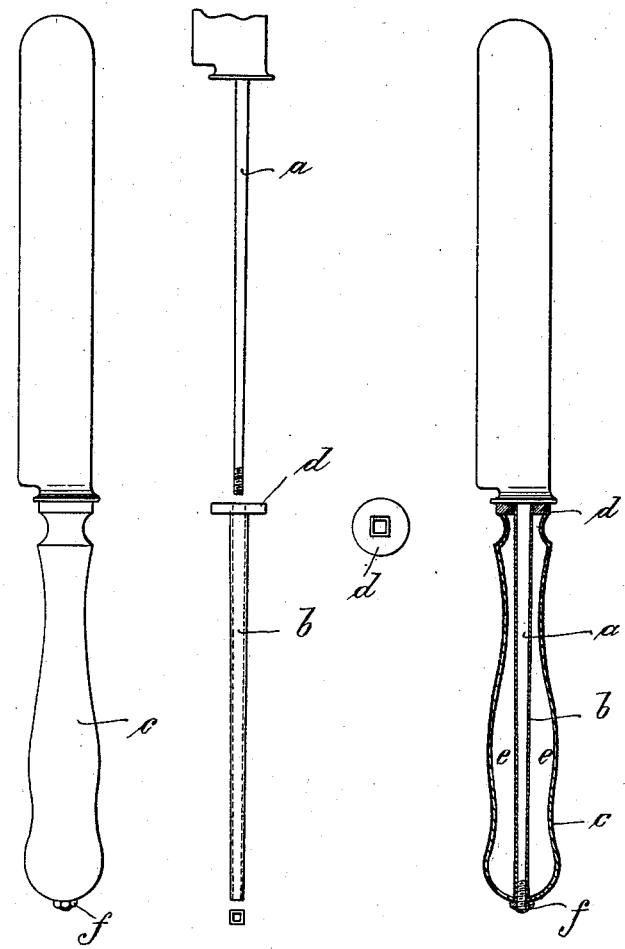

PAUL ERHARDT, OF BERLIN, GERMANY.

CONNECTING FANGS OF KNIVES, FORKS, OR THE LIKE WITH HANDLES OF SAME.

SPECIFICATION forming part of Letters Patent No. 671,544, dated April 9, 1901.

Application filed February 17, 1900. Serial No. 5,647. (No model.)

*To all whom it may concern:*

Be it known that I, PAUL ERHARDT, merchant, a subject of the German Emperor, residing in the city of Berlin, in the Empire of Germany, have invented certain new and useful Improvements in Connecting the Fangs of Knives, Forks, or the Like with the Handles of the Same, of which the following is a full, clear, and exact specification.

My invention has for its object to provide means whereby the fangs or shafts of knives, forks, and similar instruments can be connected with the hollow handles of the same without cementation.

It is a well-known fact that knives or the like in which the hollow handle is filled out with cement for fastening the fang or shaft therein are easily damaged when they are laid in hot water, because the cement then expands and causes the handle to burst. Furthermore, such knives and similar instruments are impracticable, as the handle cannot be easily removed from the fang in case the blade has been broken and must be substituted by another. All these inconveniences are avoided by using the mode of connection hereinafter described.

Referring to the accompanying drawings, in which similar letters denote similar parts, Figure 1 is an elevation of a knife made according to my said invention. Fig. 2 is a similar view in which the handle is shown in section. Fig. 3 shows details of the knife.

As illustrated in the drawings, the square fang or shaft $a$ of the knife has its bearing in a correspondingly-shaped sleeve or tube $b$, being provided at its upper end with a square-holed disk $d$. The tube $b$ is inserted into the hollow handle $c$ and fastened therein at both ends by soldering. The space left between the tube $b$ and the inner walls of the handle $c$ remains empty. The fang $a$ projects somewhat at the lower end of the handle $c$, and its projecting end is threaded, so as to engage a small nut $f$, by turning of which the fang $a$ can be firmly connected with the handle $c$.

Instead of the nut $f$ equivalent means may be used for fastening the fang $a$ within the handle $c$, and my invention is not limited to the exact form of construction shown in the drawings and hereinbefore explained.

What I claim, and desire to secure by Letters Patent, is—

In combination with a hollow handle $c$, a tube $b$ of angular construction extending longitudinally through said handle and fastened thereto at both ends by soldering or the like, a fang $a$ extending through said tube and of angular cross-section, and a nut $f$ engaging the projecting screw-threaded end of said fang, substantially as described.

Dated this 3d day of February, 1900.

PAUL ERHARDT.

Witnesses:
   HENRY HASPER,
   WOLDEMAR HAUPT.